United States Patent
Takenaka

[19]

[11] Patent Number: 6,109,045
[45] Date of Patent: Aug. 29, 2000

[54] AUTOMOTIVE AIR CONDITIONER

[75] Inventor: Kenji Takenaka, Aichi-ken, Japan

[73] Assignee: Kabushiki Kaisha Toyoda Jidoshokki Seisakusho, Kariya, Japan

[21] Appl. No.: 09/296,887

[22] Filed: Apr. 22, 1999

[30] Foreign Application Priority Data

Apr. 22, 1998 [JP] Japan .................................. 10-112087

[51] Int. Cl.[7] .............................. F25B 7/00; F25B 41/04
[52] U.S. Cl. ............................. 62/175; 62/236; 62/323.3
[58] Field of Search .................................. 62/323.3, 510, 62/199, 236, 175

[56] References Cited

U.S. PATENT DOCUMENTS

| | | | |
|---|---|---|---|
| 4,674,294 | 6/1987 | D'Agaro | 62/323.3 |
| 4,947,657 | 8/1990 | Kalmbach | 62/236 |
| 5,333,678 | 8/1994 | Mellum et al. | |

FOREIGN PATENT DOCUMENTS

| | | |
|---|---|---|
| 60-215417 | 10/1985 | Japan . |
| 60-255526 | 12/1985 | Japan . |
| 61-24213 | 2/1986 | Japan . |
| 5-319078 | 12/1993 | Japan . |
| 5-319082 | 12/1993 | Japan . |
| 6-144105 | 5/1994 | Japan . |
| 6-171349 | 6/1994 | Japan . |
| 6-234321 | 8/1994 | Japan . |
| 5-221237 | 2/1995 | Japan . |
| 7-52638 | 2/1995 | Japan . |
| 7-52639 | 2/1995 | Japan . |

*Primary Examiner*—William Wayner
*Attorney, Agent, or Firm*—Morgan & Finnegan, L.L.P.

[57] ABSTRACT

In accordance with this invention, an automotive air conditioner is provided in which operational efficiency of the air conditioner is enhanced and comfortable operation may be performed with little vibration. The automotive air conditioner comprises a front seat cooling apparatus, a rear seat cooling apparatus, an environment detection device for detecting air-conditioning environment conditions, and a controller for controlling the operation of the cooling apparatuses on the basis of air-conditioning environment conditions detected by the environment detection device. A compressor drive source for either one of the cooling apparatuses is a vehicle drive source, and a compressor drive source of the other cooling apparatus is a drive source that is independent of the vehicle drive source. More preferably, the drive source that is independent of the vehicle drive source uses an electric motor. Also, the air-conditioning environment conditions to be detected by the environment detection device includes at least one of a passenger compartment temperature, an outside temperature, a solar radiation amount and a passenger set compartment interior temperature.

3 Claims, 3 Drawing Sheets

AUTOMOTIVE AIR CONDITIONER

BACKGROUND OF THE INVENTION

1. Field of the Invention

The present invention relates to an automotive air conditioner, and more particularly to an automotive air conditioner for front and rear seating areas of an automotive vehicle.

2. Description of the Related Art

With conventional, automotive air conditioners, particularly those for leisure vehicles (recreational vehicles or RV's) such as box wagon-types or station wagon-types in which the interior is designed to be spacious, even though the number of passengers increases so that a cooling load also increases an air-conditioning system is composed of a single system having a large capacity which can cope with the load for air-conditioning.

Namely, as shown in FIG. 3, the air conditioner used in an RV vehicle is composed of a compressor 101 disposed in the vicinity of an engine (not shown), a condenser 102 disposed in the front of an engine compartment, a cooler unit 103 for a front seating area, and a cooler unit 104 for a rear seating area disposed in parallel therewith, and the like. The compressor 101 in this air conditioner is designed to be capable of coping with the cooling load for the entire passenger compartment. Moreover, the cooler unit here means a unit composed of an evaporator, an expansion valve and the like on the passenger compartment side.

Hence, when the number of passengers is small, the compressor 101 has extra capacity such that a large amount of energy can be consumed and the system is uneconomical. Also, the compressor 101 is disposed in the engine compartment, so that the distance between the compressor 101 and the cooler unit 104 for the rear seating area is long. Accordingly, refrigerant tubing for connecting them are long, resulting in an increase in refrigerant flow resistance. Consequently, the system suffers from a problem in that capacity loss increases. Also, the air conditioner is frequently engaged or disengaged by a clutch (not shown) for coupling the engine with the compressor 101. In this case, the system suffers from a problem in that the engine load is abruptly changed which generates vibrations. Also, the total length of the refrigerant tubing for connecting the condenser 102 or the cooler units 103 and 104 to the compressor 101 increases, so that refrigerating machine oil is stagnant in the refrigerant tubing when the air-conditioner is not used. Thus, the system suffers from a problem in that it is likely to cause insufficient lubrication upon the start of the compressor.

SUMMARY OF THE INVENTION

The present invention has been made in view of the above problems inherent in the prior art. An object of the present invention is to provide an automotive air conditioner with enhanced operating efficiency that may perform a comfortable cooling operation with less vibration.

In order to accomplish the above-described object, according to a first aspect of the invention, an automotive air conditioner is comprised of: a first cooling apparatus for cooling a front seating area including a compressor drive source, a compressor, a condenser, and an evaporator; a second cooling apparatus for cooling a rear seating area including a compressor drive source, a compressor, a condenser, and an evaporator; an environment detection device for detecting air-conditioning environment conditions; and a controller for controlling the operation of the first and second cooling apparatuses on the basis of air-conditioning environment conditions detected by the environment detection device, and is characterized in that a vehicle drive source is used as a compressor drive source for either one of the first and second cooling apparatuses, and a drive source that is independent of the vehicle drive source is used as a compressor drive source for the other cooling apparatus.

According to a second aspect of the invention, the compressor drive source that is independent of said vehicle drive source is an electric motor.

According to a third aspect of the invention, the first cooling apparatus is the cooling apparatus using the vehicle drive source and the second cooling apparatus is the cooling apparatus using the drive source that is independent of the vehicle drive source.

According to a fourth aspect of the invention, only when the controller determines that the cooling of the seat space by only the operation of the cooling apparatus using the vehicle drive source is insufficient, is the cooling apparatus using the drive source that is independent of the vehicle drive source operated by the controller.

According to a fifth aspect of the invention, outlet and inlet ports of the evaporator of the first cooling apparatus and outlet and inlet ports of the evaporator of the second cooling apparatus are respectively connected to each other through switching valves, and the switching valves are switched over by the controller so that both of the evaporators may be operated as evaporators for the first and/or second cooling apparatuses.

According to a sixth aspect of the invention, the air-conditioning environment conditions to be detected by the environment detection device include at least one of passenger compartment temperature, outside temperature, solar radiation amount and set passenger compartment interior temperature.

Accordingly, in the thus constructed automotive air conditioner according to the first aspect of the invention, it is possible to perform economical operation by selectively operating the cooling apparatuses that is divided in two, i.e., the cooling apparatus for the front seating area and the cooling apparatus for the rear seating area. Also, it is possible to reduce the capacity of the cooling apparatus operated by the vehicle drive source to thereby reduce the frequency of the start/stop operations of the cooling apparatus caused by the clutch that is turned on/off. Thus, the vibration due to the start/stop operation is suppressed. Also, the refrigerant tubing that form part of each cooling apparatus are shortened to reduce the capacity loss as the refrigerant flow resistance is decreased and further to reduce the amount of residual oil in the refrigerant tubing. Thus, the occurrence of insufficient lubricant oil upon the start of the compressor is reduced. Also, when the vehicle stops, it is convenient that the cooling operation is performed by the cooling apparatus using as the compressor drive source the drive source that is independent of the vehicle drive source.

In the automotive air conditioner according to the second aspect of the invention, since the drive source that is independent from the vehicle drive source is an electric motor, limitations on the location to install the drive source may be reduced. For example, it is possible to easily locate the drive source in the vicinity of the rear seat which is far from the vehicle drive source. Also, when the cooling apparatus using the independent drive source is operated when the vehicle is stopped, it is possible to perform a quiet cooling operation.

In the automotive air conditioner according to the third aspect of the invention, it is possible to locate the compressor drive source and components of each cooling apparatus close to each other, and a reasonable arrangement of the components can be performed.

In the automotive air conditioner according to the fourth aspect of the invention, the cooling apparatus using the vehicle drive source may be used as the main cooling apparatus and the cooling apparatus using the independent drive source may be used as an auxiliary cooling apparatus. This is an economical system.

In the automotive air conditioner according to the fifth aspect of the invention, in the case where the cooling load does not increase very much when the vehicle is traveling, the independent drive source is stopped, and the passenger compartment can be uniformly cooled by using the two evaporators as the evaporator for the first cooling apparatus. Also, when the vehicle is stopped, the vehicle drive source is stopped, and only the cooling apparatus using the drive source that is independent of the vehicle drive source as the compressor drive source is operated, using both evaporators, so that the passenger compartment can be uniformly cooled.

In the automotive air conditioner according to the sixth aspect of the invention, since the passenger compartment temperature, the outside temperature, the amount of solar radiation and the set passenger compartment interior temperature are used as the air-conditioning environment conditions, it is possible to control the cooling apparatuses by the determining of the cooling load so that comfortable cooling can be performed.

DESCRIPTION OF THE PREFERRED EMBODIMENTS

The present invention will now be described in detail with reference to a first embodiment shown in FIG. 1, in which the present invention is applied to an automotive air conditioner.

Figure 1:
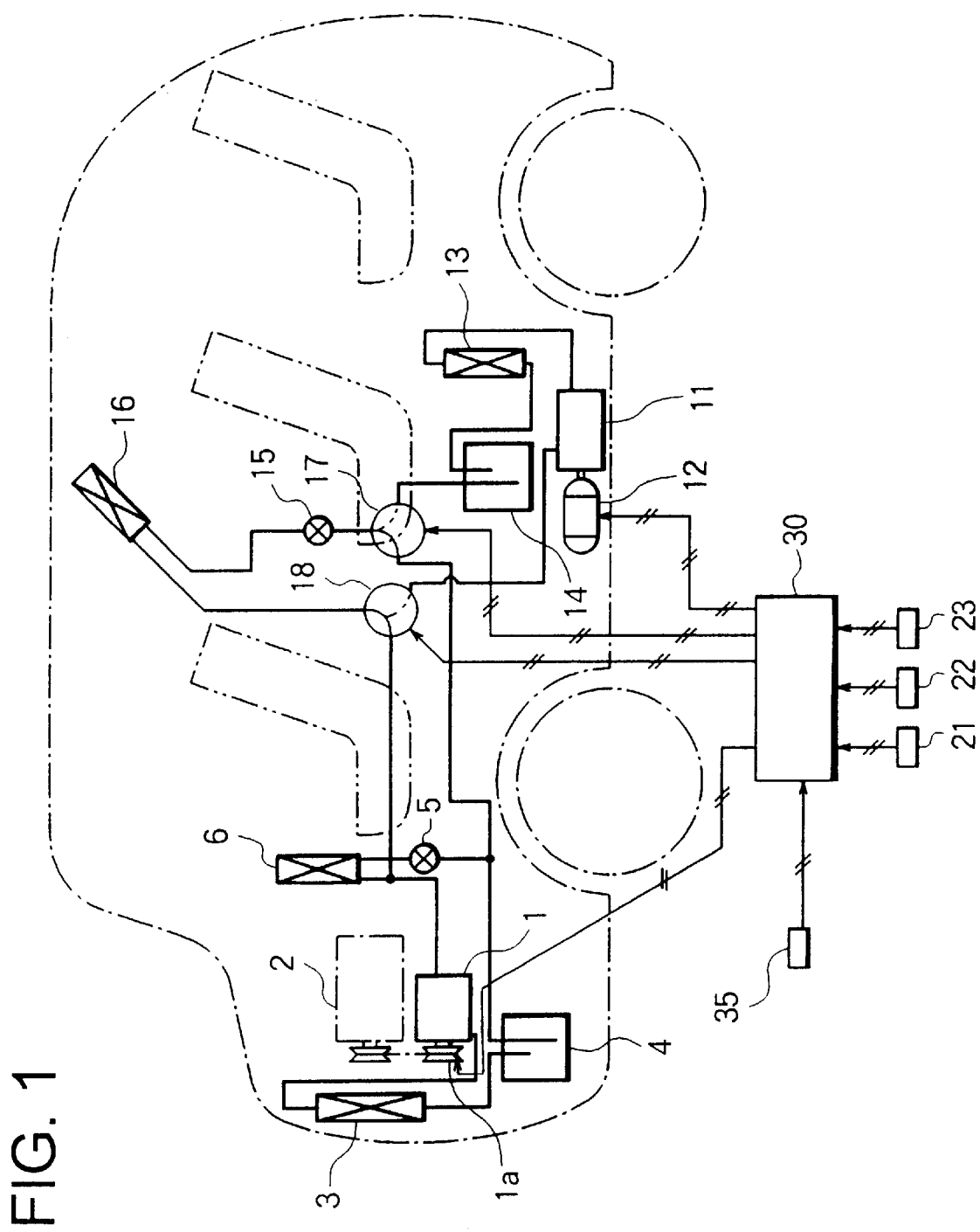
FIG. 1 is a schematic view showing a refrigerant circuit and a component arrangement in accordance with a first embodiment of the present invention.

In FIG. 1, cooling apparatus for front seating area is composed, in the following order, of a first compressor 1 connected to vehicle drive source 2 (the automotive vehicle engine in this case) through a clutch 1a so as to use the vehicle drive source 2 as its drive source, a first condenser 3, a first receiver 4, a first expansion valve 5, a first evaporator 6 and the like. On the other hand, cooling apparatus for the rear seating area is composed, in the following order, of a second compressor 11 using as its drive source a drive source that is independent of the above-described vehicle drive source, an electric motor 12 in this case, a second condenser 13, a second receiver 14, a second expansion valve 15, a second evaporator 16 and the like. Next, three-way switching valves 17 and 18 are interposed between the second receiver 14 and the second expansion valve 15 and between the second evaporator 16 and the second compressor 11, respectively, and connected between the first receiver 4 and the first expansion valve 5, and between the first evaporator 6 and the first compressor 1 of the cooling apparatus for the front seating area.

Reference numeral 21 denotes an interior air temperature sensor, reference numeral 22 denotes an exterior air temperature sensor and reference numeral 23 denotes a solar radiation sensor. These components constitute an environment detection device for detecting the air-conditioning environment conditions. Also, reference numeral 30 denotes a controller for comparing the air-conditioning environment conditions detected by the above-described environment detection device with values set by a setting device 35 to perform the start/stop control for a clutch 1a and an electric motor 12 of the above-mentioned air conditioner and the switching control for the three-way switching valves 17, 18 and the like.

The thus constructed air conditioner operates as follows.

In the case where only the front seat space is to be cooled, the cooling apparatus for the rear seating area is not operated with the above-described electric motor 12 being stopped in accordance with the instruction of the controller 30. The first compressor 1 is coupled through the clutch 1a with the engine that is the vehicle drive source 2 to drive the first compressor 1 and the cooling apparatus for the front seating area is operated. Also, at this time, the three-way switching valves 17 and 18 are switched to the connection positions indicated by the dotted lines in the drawing, in accordance with the instruction of the controller 30.

Thus, the high pressure refrigerant discharged from the first compressor 1 is condensed in the first condenser 3 and fed to the receiver 4 as liquid refrigerant. Then, the high pressure liquid refrigerant is introduced through the first expansion valve 5 into the first evaporator 6. Also, the refrigerant cools the interior air in front of the evaporator 6. The refrigerant itself is evaporated and gasified and returned to the first compressor 1. Thus, the front seat space is cooled.

Next, in the case where it is necessary to also cool the rear seat space, and in the case where, in accordance with the air-conditioning environment conditions detected by the environment detection device (for example, in accordance with the comparison between the room temperature set by the setting device 35 and the actual room temperature detected by the interior air temperature sensor 21), the controller 30 determines that the air-conditioning load for the front and rear seating areas is not large, the electric motor 12 is kept stopped in accordance with the instruction of the controller 30 and the above-described three-way switching valves 17 and 18 are switched over to the connection positions indicated by the solid lines to thereby operate only the above-described first compressor 1. Thus, the high pressure refrigerant discharged from the first compressor 1 is condensed in the first condenser 3 and is introduced into the receiver 4 in the form of liquid refrigerant. Then, a portion of the high pressure liquid refrigerant is introduced through the first expansion valve 5 into the first evaporator 6, and the rest of the refrigerant is introduced through the second expansion valve 15 into the second evaporator 16. Also, the refrigerant cools the front and rear interior air in front of the respective evaporators 6 and 16 and the refrigerant is evaporated and gasified to be returned back to the first compressor 1. Thus, the front and rear seat spaces are cooled.

Furthermore, in the case where, in accordance with the air-conditioning environment conditions detected by the environment detection device, the controller 30 determines that the air-conditioning load for the front and rear seating areas is large, the three-way switching valves 17 and 18 are switched over to the connection positions indicated by the dotted lines in FIG. 1 by the instruction of the controller 30. Also, the electric motor 12 is operated to thereby drive the second compressor 11.

Accordingly, the cooling apparatus for the front seating area is operated with the refrigerant circuit for connecting, in the following order, the first compressor 1, the first condenser 3, the first receiver 4, the first expansion valve 5, the first evaporator 6 and the first compressor 1 to each other, thereby cooling the interior air within the front seat space. Also, the cooling apparatus for the rear seating area is operated by the refrigerant circuit for connecting, in the following order, the second compressor 11, the second condenser 13, the second receiver 14, the three-way switching valve 17, the second expansion valve 15, the second evaporator 16, the three-way switching valve 18 and the second compressor 11 to each other, thereby cooling the rear seat space.

Also, in the case where only the space for the rear seats is to be cooled under conditions in which the vehicle is not traveling and the like, a stop instruction is issued to the cooling apparatus for the front seating area through the controller 30. Also, in accordance with the instruction from the controller 30, the three-way switching valves 17 and 18 are located at the connection positions indicated by the dotted lines in FIG. 1, thereby operating the electric motor 12. Thus, the apparatus is operated by the refrigerant circuit for connecting, in the following order, the second compressor 11, the second condenser 13, the second receiver 14, the three-way switching valve 17, the second evaporator 16, the three-way switching valve 18 and the second compressor 11 to each other, thereby cooling the rear seat space.

In accordance with the thus constructed first embodiment, the air conditioner is divided into the cooling apparatus for the front seating area and the cooling apparatus for the rear seating area, and the respective cooling apparatuses are designed to have small capacities. Accordingly, it is possible to perform economical operation by selectively using the cooling apparatuses. Also, since the capacity of the cooling apparatus connected to the vehicle drive source is small, the ON/OFF frequency of the clutch 1a and the load variation generated with every ON/OFF of the clutch 1a becomes smaller, and the vibration caused by the ON/OFF of the clutch 1a is reduced. Also, since the refrigerant tubing that constitute the respective cooling apparatuses are shortened, the capacity loss based upon the refrigerant flow resistance is reduced. Furthermore, the oil stagnation in the refrigerant tubing is reduced, and insufficiency in lubricant oil upon the start of the compressors is reduced. Also, it is convenient that the cooling operation may be performed by the rear seat cooling apparatus using the independent drive source as the compressor drive source while the vehicle is stopped.

Also, the vehicle drive source 2 is used as the compressor drive source for the front seat cooling apparatus and the electric motor 12 is used as the compressor drive source for the rear seat cooling apparatus, so that a reasonable equipment arrangement may be attained. Also, the restrictions on the location to install the compressor drive source in the rear seat cooling apparatus are reduced, and it is possible to design the apparatus as desired. Also, it is possible to perform a quiet cooling operation by using the electric motor 12 as the compressor drive source while the vehicle is stopped.

Also, since the cooling apparatus uses the vehicle drive source 2 as the compressor drive source of the main cooling apparatus and uses the electric motor 12 as the compressor drive source of the auxiliary cooling apparatus, it is possible to perform a economical operation.

Also, when the front seat cooling apparatus is operated by using the vehicle drive source as the compressor drive source, since by switching the three-way switching valves 17 and 18 the refrigerant is also fed to the second evaporator 16 of the rear seat cooling apparatus to thereby cool the front and rear seat spaces, it is possible to perform uniform cooling over the entire passenger compartment in an economical manner when the air-conditioning load is small.

A second embodiment will now be described with reference to FIG. 2.

In accordance with the second embodiment, when the electric motor 12 is operated to operate the rear seat cooling apparatus, by adopting a different structure switching mechanism in the three-way switching valves 17 and 18 of the first embodiment, in addition to the above-mentioned operational mode, the first evaporator 6 of the front seat cooling apparatus may be operated as a refrigerant circuit connected in parallel with the second evaporator 16.

Figure 2:
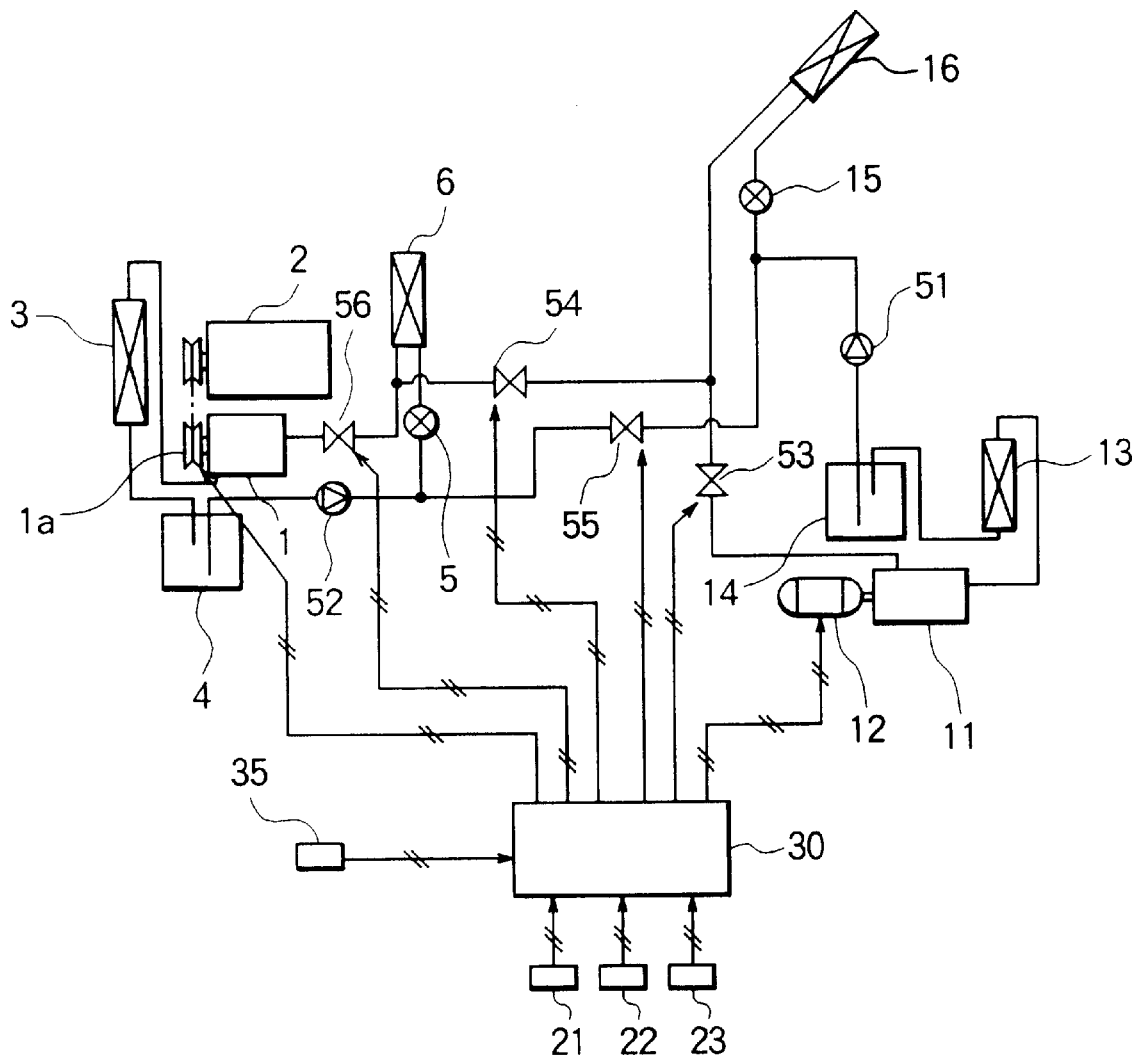
FIG. 2 is a schematic view showing a refrigerant circuit and a component arrangement in accordance with a second embodiment of the present invention.
Figure 3:
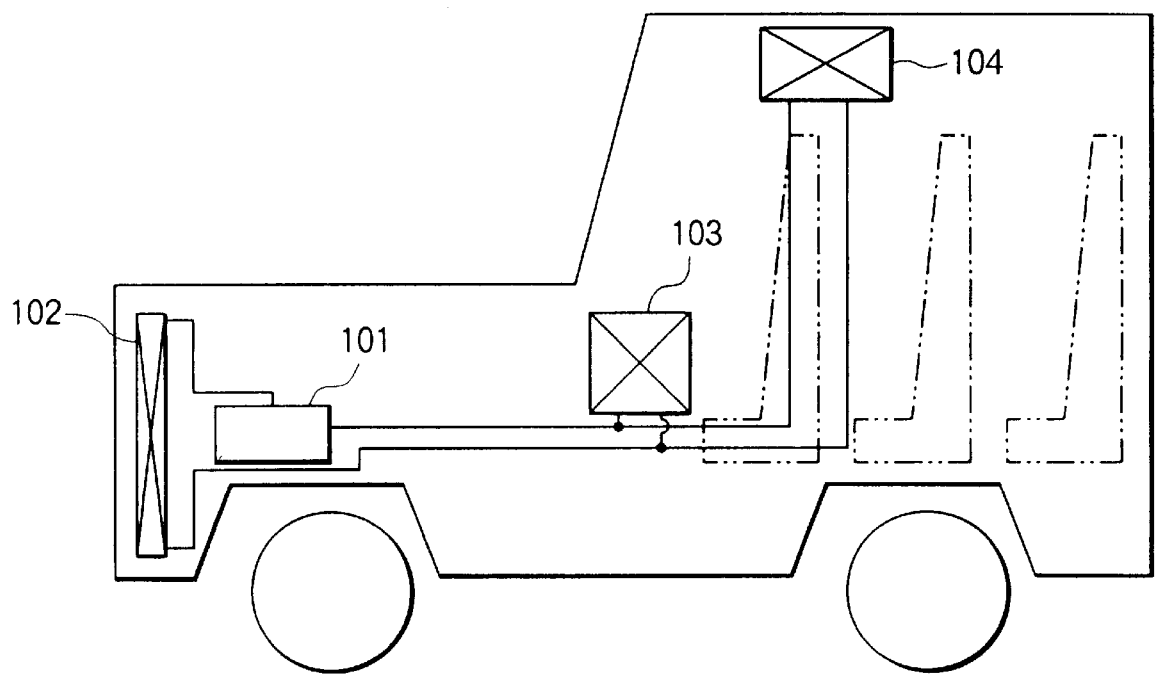
FIG. 3 is a schematic view showing component arrangement of a conventional automotive air conditioner.

The refrigerant circuit in accordance with the second embodiment is shown in FIG. 2. Nevertheless, the same reference numerals are used to denote components similar to or like those of the first embodiment, their explanation will be omitted.

In FIG. 2, reference numerals 51 and 52 denote check valves. Reference numerals 53, 54, 55 and 56 denote on/off valves. The following operation may be performed by performing opening/closing control, on/off control or start/stop control of these on/off valves 53, 54, 55 and 56, the clutch 1a and the electric motor 12, respectively, in accordance with the instruction from the controller 30. Moreover, Table 1 shows the opening/closing conditions of the on/off valves 53, 54, 55 and 56 in accordance with the following operational modes.

First, when only the front seat space is to be cooled when the vehicle drive source 2 (engine) is operating, such as while the vehicle is travelling, the on/off valves 53, 54 and 55 are closed, and, at the same time, the on/off valve 56 is opened. Thus, a refrigerant circuit is formed such that the refrigerant is recirculated in the following order from the first compressor 1, through the first condenser 3, the first receiver 4, the check valve 52, the first expansion valve 5, the first evaporator 6, and the on/off valve 56 to the first compressor 1. Then, the clutch 1a is turned on to thereby connect the first compressor 1 to the vehicle drive source 2 to drive the first compressor 1. Thus, the front seat cooling apparatus is operated.

TABLE 1

|  |  | on/off valve 53 | on/off valve 54 | on/off valve 55 | on/off valve 56 |
|---|---|---|---|---|---|
| cool front seats only | | CLOSE | CLOSE | CLOSE | OPEN |
| cool front and rear seats (small thermal load) | engine operating | CLOSE | OPEN | OPEN | OPEN |
| | engine stopped | OPEN | OPEN | OPEN | CLOSE |
| cool front and rear seats (large thermal load) | | OPEN | CLOSE | CLOSE | OPEN |

TABLE 1-continued

|  | on/off valve 53 | on/off valve 54 | on/off valve 55 | on/off valve 56 |
|---|---|---|---|---|
| cool rear seats only (engine stopped) | OPEN | CLOSE | CLOSE | CLOSE |

Subsequently, in the case where the passenger compartment cooling thermal load is small when the vehicle drive source 2 (engine) is operating, such as while the vehicle is travelling, and the front and rear seat spaces (i.e., the entire passenger compartment) are to be cooled, the on/off valve 53 is closed and the on/off valves 54, 55 and 56 are opened without operating the electric motor 12. Thus, the refrigerant flows through the first compressor 1, the first condenser 3, the first receiver 4 and the check valve 52. Thereafter, a portion that is branched therefrom flows through the first expansion valve 5 and the first evaporator 6 and the rest flows through the on/off valve 55, the second expansion valve 15, the second evaporator 16 and the on/off valve 54 to merge with the branched portion. Thus a refrigerant circuit in which the merged refrigerant is returned back to the first compressor 1 through the on/off valve 56 is formed. Then, the clutch 1a is turned on and the first compressor 1 is connected to the vehicle drive source 2 so that the entire passenger compartment is cooled by the front seat cooling apparatus.

Also, in the case where the passenger compartment cooling thermal load is small when the vehicle drive source 2 (engine) is stopped while the vehicle is stopped, when the front and rear seat spaces (i.e., the entire passenger compartment) are to be cooled, the on/off valve 56 is closed, and the on/off valves 53, 54 and 55 are opened. Thus, the refrigerant flows through the second compressor 11, the second condenser 13, the second receiver 14 and the check valve 51. Thereafter, the branched portion flows through the second expansion valve 15 and the second evaporator 16. The rest of the refrigerant flows through the on/off valve 55, the first expansion valve 5, the first evaporator 6 and the on/off valve 54 to be merged with branched portion. Thus a refrigerant circuit is formed in which the merged refrigerant is returned back to the second compressor 11 through the on/off valve 53. Then, the electric motor 12 is operated to thereby drive the second compressor 11 so that the entire passenger compartment is cooled by the rear seat cooling apparatus.

Moreover, in the case where the vehicle drive source 2 is operating, such as when the vehicle is traveling, it is also possible to perform the cooling operation as described above by turning off the clutch 1a to thereby disengage the vehicle drive source 2 from the first compressor 1, and operating the electric motor 12.

Subsequently, in the case where the passenger compartment cooling thermal load is increased, when the front and rear seat spaces (i.e., the entire passenger compartment) are to be cooled, the on/off valves 54 and 55 are closed, and the on/off valves 53 and 56 are opened. Thus, the refrigerant circuit for recirculating the refrigerant from the first compressor 1, to the first condenser 3, the first receiver 4, the check valve 52, the first expansion valve 5, the first evaporator 6, the on/off valve 56 and back to the first compressor 1, and the refrigerant circuit for recirculating the refrigerant from the second compressor 11, to the second condenser 13, the second receiver 14, the check valve 51, the second expansion valve 15, the second evaporator 16, the on/off valve 53 and back to the second compressor 11 are formed. Then, the clutch 1a is turned on to thereby connect the first compressor 1 to the vehicle drive source 2 to drive the first compressor 1, and at the same time, to drive the second compressor 11 by the electric motor 12 so that the front and rear seat cooling apparatuses are operated in parallel to thereby cool the entire passenger compartment.

Subsequently, when only the rear seat space is to be cooled, the on/off valves 54, 55 and 56 are closed, and, at the same time, the on/off valve 53 is opened. Thus, a refrigerant circuit is formed in which the refrigerant is recirculated through the second compressor 11, to the second condenser 13, the second receiver 14, the check valve 51, the second expansion valve 15, the second evaporator 16, the on/off valve 53 and back to the second compressor 11. Then, the second compressor is driven by the electric motor 12 to thereby operate the rear seat cooling apparatus.

According to the thus constructed second embodiment, in the same way as in the above-described first embodiment, it is possible to perform the four kinds of cooling operations, i.e., the cooling operation for the front seat space using only the vehicle drive source 2 as the compressor drive source, the cooling operation for the entire space of the front and rear portions using the vehicle drive source 2 as the compressor drive source, the cooling operation for the entire space of the front and rear portions using the vehicle drive source 2 and the electric motor 12 as the compressor drive sources, and the cooling operation for the rear seat space using the electric motor 12 as the compressor drive source. In addition to these operational modes, it is possible to perform the cooling operation for the entire space of the front and rear portions using only the electric motor 12 as the compressor drive source. Accordingly, when the vehicle is not traveling, it is possible to uniformly cool the overall region of the passenger compartment by utilizing the electric motor 12.

Since the present invention is structured as described above, the following advantages may be insured.

According to the first to sixth aspects of the invention, it is possible to perform economical operation by selectively operating the cooling apparatus for the front seating area and the cooling apparatus for the rear seating area. Also, it is possible to reduce the capacity of the cooling apparatus using the vehicle drive source as the compressor drive source to thereby reduce the frequency of the start/stop operations of the cooling apparatus caused by the clutch that is turned on or off. Thus, vibration is suppressed. Also, the refrigerant tubing for a part of each cooling apparatus is shortened to suppress the capacity loss and to reduce the amount of the residual oil in the refrigerant tubing. Thus, insufficiency in lubricant oil is reduced upon the start of the compressor. Also, when the vehicle is stopped, it is convenient that cooling is also performed by the cooling apparatus using the drive source independent of the vehicle drive source.

According to the second aspect of the invention, the limitations on the location to install the drive source may be reduced. Also, it is possible to perform a quiet cooling operation when the vehicle is stopped.

According to the third aspect of the invention, the components can be efficiently arranged.

According to the fourth aspect of the invention, in an automotive air conditioner, the cooling apparatus using the vehicle drive source may be used as the main cooling apparatus and the cooling apparatus using the compressor drive source independent of the vehicle drive source may be used as the auxiliary cooling apparatus, making an economical apparatus.

According to the fifth aspect of the invention, it is possible to uniformly cool the passenger compartment by operating only one of the compressor drive sources.

According to the sixth aspect of the invention, it is possible to control the cooling apparatuses by determining the cooling load from the air-conditioning environment conditions to thereby perform a comfortable cooling operation.

Various details of the invention may be changed without departing from its spirit or scope. Furthermore, the foregoing description of the embodiments according to the present invention is provided for the purpose of illustration only, and not for the purpose of limiting the invention as defined by the appended claims and their equivalents.

What is claimed is:

1. An automotive air conditioner comprising:
    a first cooling apparatus for cooling a front seating area including a compressor drive source, a compressor, a condenser, and an evaporator,
    a second cooling apparatus for cooling a rear seating area including a compressor drive source, a compressor, a condenser, and an evaporator,
    an environment detection device for detecting air-conditioning environment conditions; and
    a controller for controlling the operation of said first and second cooling apparatuses on the basis of air-conditioning environment conditions detected by said environment detection device,
    wherein a vehicle drive source is used as a compressor drive source for either one of said first and second cooling apparatus and a drive source that is independent of said vehicle drive source is used as a compressor drive source for the other cooling apparatus, and
    wherein when said controller determines that the cooling of the seat space by the operation of the cooling apparatus using said vehicle drive source is insufficient, the cooling apparatus using the drive source that is independent of said vehicle drive source is operated by said controller.

2. An automotive air conditioner comprising:
    a first cooling apparatus for cooling a front seating area including a compressor drive source, a compressor, a condenser, and an evaporator,
    a second cooling apparatus for cooling a rear seating area including a compressor drive source, a compressor, a condenser, and an evaporator,
    an environment detection device for detecting air-conditioning environment conditions; and
    a controller for controlling the operation of said first and second cooling apparatuses on the basis of air-conditioning environment conditions detected by said environment detection device,
    wherein a vehicle drive source is used as a compressor drive source for either one of said first and second cooling apparatus and a drive source that is independent of said vehicle drive source is used as a compressor drive source for the other cooling apparatus, and
    wherein outlet and inlet ports of the evaporator of said first cooling apparatus and outlet and inlet ports of the evaporator of said second cooling apparatus are respectively connected to each other through switching valves, and said switching valves are switched over by said controller so that both of said evaporators may be operated as evaporators for the first or second apparatuses.

3. The automotive air conditioner according to claim 1, wherein the air-conditioning environment conditions to be detected by said environment detection device include at least one of passenger compartment temperature, outside temperature, solar radiation amount and set passenger compartment interior temperature.

* * * * *